June 6, 1933.  A. SMATH ET AL  1,913,094
LAWN MOWER ATTACHMENT
Filed Oct. 3, 1932   2 Sheets-Sheet 2

Inventors
Albert Smath
Ernest Bayer
By Clarence A. O'Brien
Attorney

Patented June 6, 1933

1,913,094

UNITED STATES PATENT OFFICE

ALBERT SMATH AND ERNEST BAYER, OF EAST ISLIP, NEW YORK

LAWN MOWER ATTACHMENT

Application filed October 3, 1932. Serial No. 636,062.

The present invention relates to new and useful improvements in lawn mowers, and has for its primary object to provide, in a manner as hereinafter set forth, an attachment for lawn mowers, for cutting weeds and comparatively tall grass, thus materially increasing the efficiency of said lawn mower.

Another very important object of the invention is to provide an attachment of the aforementioned character for lawn mowers including a reciprocating cutter, together with novel means through the medium of which said cutter may be conveniently and expeditiously connected to the mower for actuation thereby or disconnected from said mower.

Other objects of the invention are to provide a lawn mower attachment of the character described which will be simple in construction, strong, durable, highly efficient and reliable in operation, compact, light in weight, which may be quickly mounted on a conventional lawn mower without the necessity of materially altering said mower structurally, and which may be manufactured at low cost.

All of the foregoing and still further objects and advantages of the invention, will become apparent from a study of the following specification, taken in connection with the accompanying drawings wherein like characters of reference designate corresponding parts thruout the several views, and wherein:—

Fig. 3 is a view in horizontal section through the attachment, taken substantially on the line 3—3 of Fig. 1.

Figure 1:
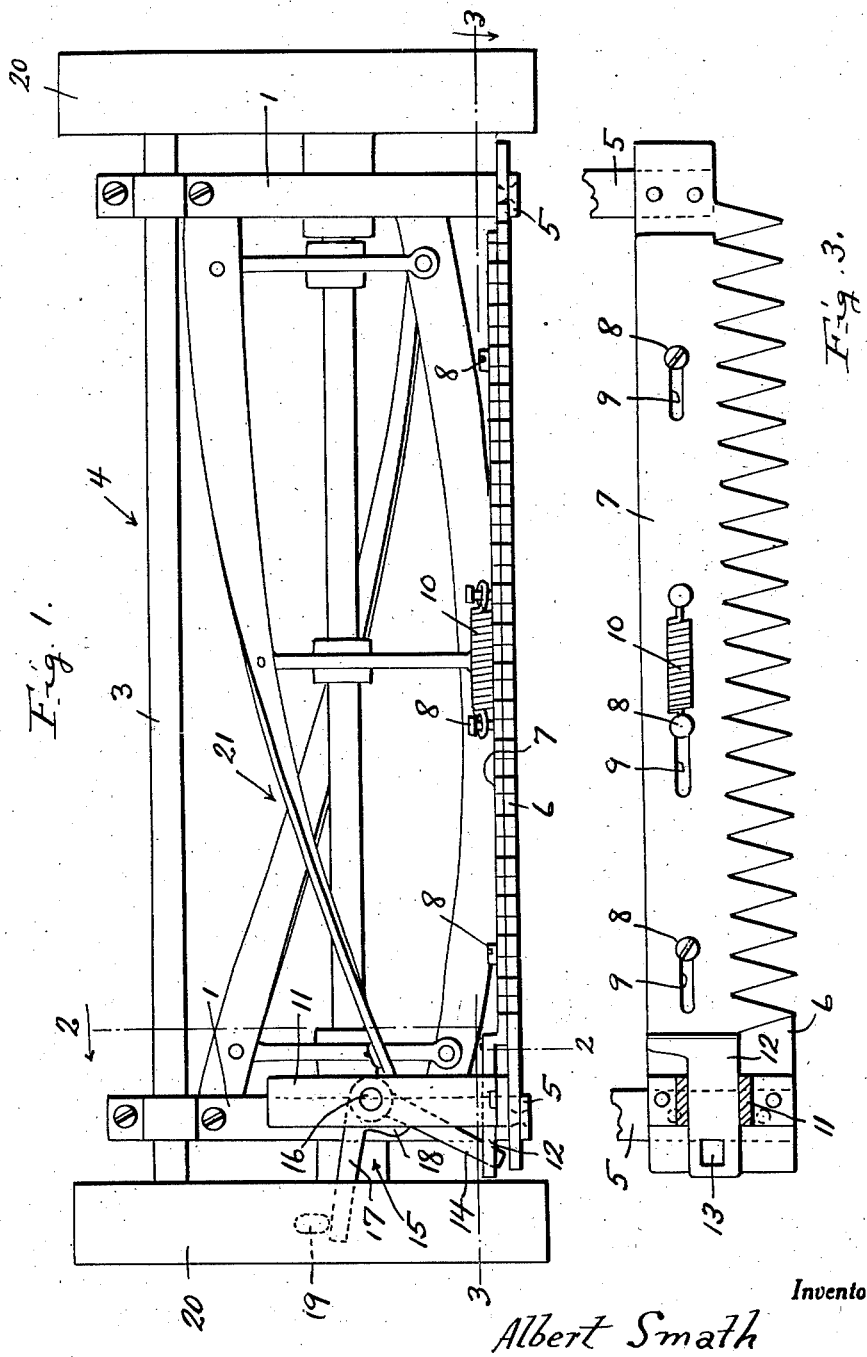
Figure 1 is a view in front elevation of a lawn mower with an attachment in accordance with the present invention mounted for operation thereon.
Figure 2:
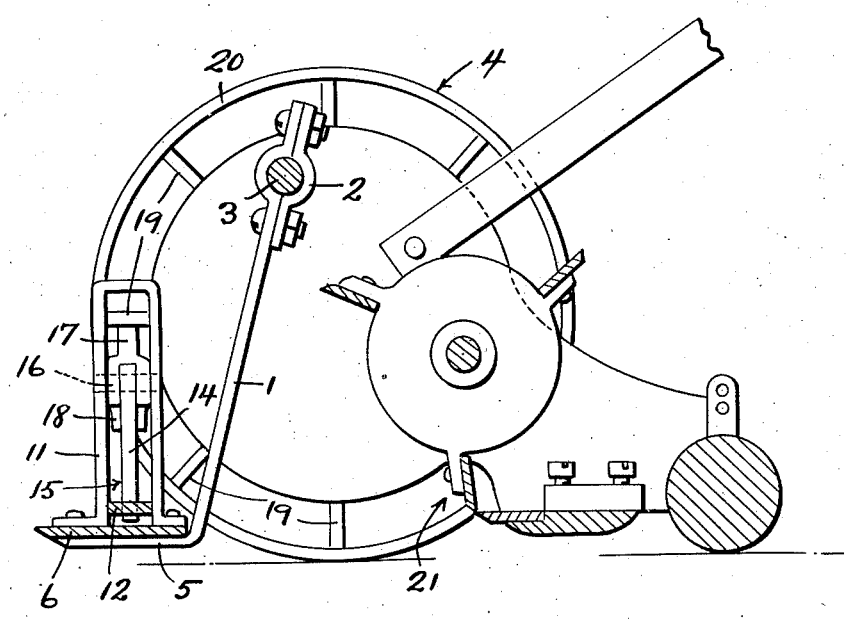
Fig. 2 is a view in vertical longitudinal section, taken substantially on the line 2—2 of Fig. 1.

Referring now to the drawings in detail, it will be seen that the embodiment of the invention which has been illustrated comprises a pair of metallic brackets 1 which are secured, through the medium of suitable clamps 2, to the usual stationary transverse bar 3 of a conventional lawn mower which is designated generally by the reference numeral 4.

The brackets 1 extend downwardly and forwardly from the bar 2 of the mower 4 and terminate, at their lower ends, in forwardly projecting horizontal portions 5 upon which a guard plate 6 is mounted. A toothed cutter bar 7 is mounted for reciprocation on the guard 6 and is slidably secured thereon through the medium of bolts 8 which are anchored in said guard and which extend through slots 9 which are provided therefor in the cutter bar 7. The cutter bar 7 is actuated in one direction by a coil spring 10 having one end connected to said cutter bar and its other end connected to one of the bolts 8.

Rising from one end portion of the guard 6 is a substantially U-shaped frame 11 through the lower portion of which an upwardly offset arm 12 on the adjacent end of the cutter bar 7 slidably extends. The arm 12 is provided with an opening 13 in its free end portion which receives the arm 14 of a sectional bell crank lever which is designated generally by the reference numeral 15. The sectional bell crank lever 15 is mounted for swinging movement in a vertical plane in the frame 11 on a pin 16 in said frame. The bell crank lever 15 further includes an arm 17 which is operatively connected to the arm 14 for actuating said arm 14 in one direction by a finger 18 which projects from the pivoted end of said arm 17. As will be seen, the arms 14 and 17 of the bell crank lever 15 are mounted for swinging movement on the pivot pin 16 and the construction is such that the arm 17 may be swung away from the arm 14. The spokes 19 of one of the wheels 20 of the mower engage the arm 17 for actuating the bell crank lever 15 in one direction. When thus actuated, the bell crank lever 15 moves the cutter bar 7 against the tension of the coil spring 10, said coil spring actuating the cutter bar in the opposite direction.

The reciprocating movement of the cutter is controlled or regulated by the distance between the spokes on the wheels and the angle between the arms 14 and 17 and these may be so arranged as to produce the desired reciprocation.

Figure 4:
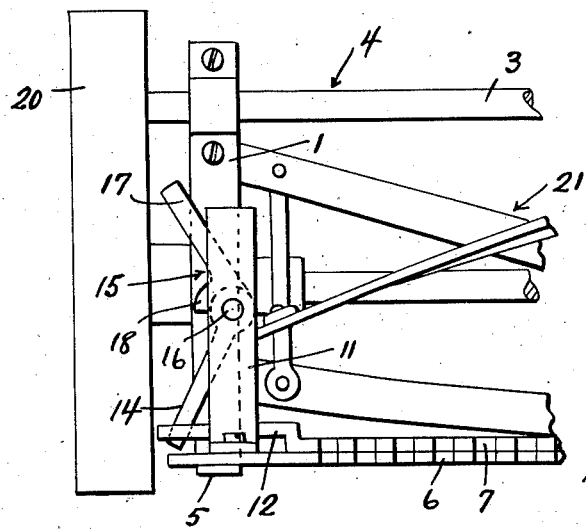
Fig. 4 is a detail view in front elevation, showing the reciprocating cutter of the attachment disconnected from the mower.

It will thus be seen that the cutter bar 7 is mounted for operation forwardly of the usual cutting mechanism 21 of the lawn mower 4 for cutting weeds and comparatively long grass. When it is desired to render the attachment inoperative, this may be conveniently and expeditiously accomplished by simply swinging the arm 17 of the sectional bell crank 15 upwardly to a position out of the path of the spokes 19 on the adjacent wheel 20 of the lawn mower, as is clearly illustrated in Fig. 4 of the drawings. If desirable or necessary, any suitable means may be provided for securing the arm 17 in raised or inoperative position.

It is believed that the many advantages of a lawn mower attachment constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

Having thus described our invention what we claim as new is:—

An attachment for wheeled lawn mowers, wherein the wheels are provided with spokes, brackets mounted on the mower, a guard plate mounted on the brackets, a substantially U-shaped frame extending from one end portion of the guard plate, a cutter bar mounted for reciprocation on the guard plate, an upwardly offset arm on one end of the cutter bar extending slidably through the frame, said arm having an opening in its free end portion, a bell crank lever pivotally mounted in the frame and operatively associating said cutter bar to one of the wheels of the mower for actuation thereby, the bell crank lever comprising a pair of independently movable arms, one of said arms being engaged in the opening in the cutter bar arm, the other of said arms being engageable by the spokes of one wheel of the mower for actuation thereby, and a finger on said other arm engageable with said one arm for actuating same in one direction.

In testimony whereof we affix our signatures.

ALBERT SMATH.
ERNEST BAYER.